(12) United States Patent
Zhou et al.

(10) Patent No.: US 8,955,826 B2
(45) Date of Patent: Feb. 17, 2015

(54) BUTTON WATER-STOPPING DEVICE AND ITS CONTROL METHOD

(75) Inventors: Huasong Zhou, Xiamen (CN); Jianmin Chen, Xiamen (CN); Renzhong Li, Xiamen (CN); Zhongcheng Jin, Xiamen (CN)

(73) Assignees: Xiamen Solex High-Tech Industries Co., Ltd., Xiamen (CN); Huasong Zhou, Xiamen (CN)

( * ) Notice: Subject to any disclaimer, the term of this patent is extended or adjusted under 35 U.S.C. 154(b) by 365 days.

(21) Appl. No.: 13/392,806

(22) PCT Filed: Sep. 16, 2010

(86) PCT No.: PCT/CN2010/076977
§ 371 (c)(1),
(2), (4) Date: Feb. 27, 2012

(87) PCT Pub. No.: WO2011/038640
PCT Pub. Date: Apr. 7, 2011

(65) Prior Publication Data
US 2012/0152365 A1    Jun. 21, 2012

(30) Foreign Application Priority Data
Oct. 1, 2009    (CN) .......................... 2009 1 0308074

(51) Int. Cl.
*F16K 31/44* (2006.01)
*B05B 1/30* (2006.01)
*F16K 31/06* (2006.01)
*F16K 31/524* (2006.01)

(52) U.S. Cl.
CPC ............... *B05B 1/3026* (2013.01); *F16K 31/06* (2013.01); *F16K 31/52475* (2013.01)
USPC ............ 251/228; 251/229; 251/294; 251/301

(58) Field of Classification Search
USPC ................. 251/228–229, 259, 294, 298, 356, 251/301–302, 193, 215, 205–209, 251
See application file for complete search history.

(56) References Cited

U.S. PATENT DOCUMENTS

| | | | | |
|---|---|---|---|---|
| 2,889,852 A | * | 6/1959 | Dunlap | 137/625.19 |
| 3,174,694 A | * | 3/1965 | Kitabayashi | 239/573 |
| 4,161,307 A | * | 7/1979 | Clinch et al. | 251/206 |
| 5,881,999 A | | 3/1999 | Chen | |
| 6,027,099 A | * | 2/2000 | Pusateri | 251/339 |

FOREIGN PATENT DOCUMENTS

| | | |
|---|---|---|
| CN | 2282096 Y | 5/1998 |
| CN | 2318465 Y | 5/1999 |
| CN | 2806909 Y | 8/2006 |
| CN | 1864866 A | 11/2006 |
| CN | 101670322 A | 3/2010 |
| GB | 788941 A | 1/1958 |

* cited by examiner

*Primary Examiner* — Marina Tietjen
(74) *Attorney, Agent, or Firm* — Rabin & Berdo, P.C.

(57) ABSTRACT

A button water-stopping device has a button mechanism that can be glidingly connected to a main body, a shaking plate that can be asway set in the main body. The main body has a water channel that can penetrate the main body and a division board that is hermetically set in the water channel and has the first water hole that penetrates the division board. The button mechanism has a button and an elastic rod which is fixed under the button, and reaches into the water channel. The shaking plate has the second water hole that penetrates the shaking plate and a control groove which has two cooperative grooves. The elastic rod reaches into the control groove and can alternatively resist one of the two cooperative grooves to make the shaking plate swing left or right.

19 Claims, 7 Drawing Sheets

BUTTON WATER-STOPPING DEVICE AND ITS CONTROL METHOD

FIELD OF THE INVENTION

The present invention relates to a water-stopping device used in the bathroom products, more particularly to a button water-stopping device.

BACKGROUND OF THE INVENTION

At the prior art, most of the water-stopping devices used in the bathroom products are lever switch device. The invention "water control mechanism used in the bath shower" (CN 1864866 A) discloses a water control mechanism combined with the bath shower, its shell has a water inflow cavity and some effluent cavities, each effluent cavity has a returning spring and a sealing valve, some buttons corresponding to the effluent cavities are set on the lateral surface of the handle of the bath shower, different effluent forms are achieved under the elastic force of the returning spring and the cooperation of every components by pressing the said buttons. However, the valve rod is fixed to the button, the gliding relationship between the buttons and the valve rod makes the water control mechanism on or off, so that it is unable to achieve the resetting of the buttons.

SUMMARY OF THE INVENTION

The object of the present invention is to overcome the defects at the prior art, and to offer a button water-stopping device and its control method.

One of the technical proposals to solve its technical matters in the present invention is:

A button water-stopping device, it comprises:

A main body, it has a water channel that can penetrates the main body back and forth and a division board that is hermetically set in the water channel and has the first water hole that penetrates the division board back and forth;

A button mechanism that can slip up and down is glidingly connected to the main body, it comprises a button and an elastic rod fixed under the button, and the said elastic rod reaches into the water channel, and A shaking plate that can be asway set in the main body, it has the second water hole that penetrates the shaking plate back and forth and a control groove which comprises two cooperative grooves that are bilateral set;

Among which, the said elastic rod reaches into the control groove and can alternatively resist one of the two cooperative grooves to make the shaking plate swing to left or to right, so that the second water hole of the shaking plate is aligned with the first water hole to make the water channel open, or is staggered from the first water hole to make the water channel shut.

According to one of the preferred embodiments, the said cooperative groove is V-shape and has an inboard guiding wall that has guiding action and an outboard relying wall that has the relying action.

According to one of the preferred embodiments, the said two cooperative grooves are bilaterally symmetrically set.

According to one of the preferred embodiments, the said two cooperative grooves make the control groove be W-shape.

According to one of the preferred embodiments, the swing shaft of the said shaking plate is right under the button mechanism; a mounting hole is established on the said main body, the said elastic rod passes through the mounting hole from outside to inside, and reaches into the water channel and the control groove.

According to one of the preferred embodiments, it further comprises a positioning mechanism, the said positioning mechanism comprises an elastic part and a positioning pin resisted by the elastic part, two positioning grooves are bilateral symmetrically set in the said shaking plate, the said positioning pin alternatively resists one of the two said positioning grooves to maintain the device in the opening state or the shutting state, According to one of the preferred embodiments, it further comprises a shell, the main body is fixed and sleeved in the said shell, and a through hole is established on the shell, and the through hole penetrates the shell from inside to outside, and the button can be glidingly connected in the through hole, and the returning spring is set between the button and the main body.

According to one of the preferred embodiments, it further comprises a connector that is fixed at the front of the main body, the said positioning mechanism is set between the connector and the shaking plate.

According to one of the preferred embodiments, the said swing shaft of the shaking plate is inserted in the positioning hole of the division board, the said shaking plate can glidingly rely on the front of the division board;

According to one of the preferred embodiments, the said sealing plate divides the said main body into an upper enclosed space and a lower water channel; the button mechanism and the returning spring can move up and down in the enclosed space; the shaking plate can asway set in the water channel.

According to one of the preferred embodiments, the said shaking plate is an approximatively semicircular plate.

Another technical proposal to solve its technical matters in the present invention is:

A control method of the button water-stopping device, it comprises:

Step 1 when the button is pressed down, the elastic rod of the button glides downwards, when the elastic rod touches the guiding wall of one of the cooperative groove of the shaking plate's control groove, the elastic rod is bended by the guiding wall and glides downwards along the guiding wall until the peak of the elastic rod relies on the relying wall of the said cooperative groove of the control groove.

Step 2 when the pressing down of the button is going on, the elastic rod resists the relying wall of the shaking plate to make the shaking plate swing to left or to right, so that the second water hole of the shaking plate is aligned with the first water hole to make the water channel open, or the second water hole is staggered from the first water hole to make the water channel shut.

Compared with the technology at the prior art: the inventor of the present invention skillfully matches the elastic bending characteristic of the elastic rod with the two cooperative grooves of the control groove, and makes the shaking plate swing to left or to right by alternative inserting and resisting of the elastic rod to the two cooperative grooves, so that the on or off of the water channel through the button is achieved, so the benefits of the present invention are: 1 swinging the shaking plate can make the two water hole be staggered or aligned to each other, so that the on or off of the water channel are achieved with good sealing performance and easy control; 2 the resetting of the button has good appearance. Because the cooperative grooves are V-shape, and it has a guiding wall that has the guiding effect and a relying wall that has the resisting and touching effect, the control is accuracy according to on or off controlled by the odevity of pressing action. Two cooperative grooves are symmetrical cooperated to make the control groove W-shape, the peak of the two cooperative grooves' joint is raised punctiform or linear, so that the control is accuracy, and it makes sure that the elastic rod enters the cooperative groove accurately to avoid the joint blocking the elastic rod' peak gliding. Because the swing shaft of the shaking plate is right under the button mechanism, the control of the water channel's on or off can be achieved by the odevity of pressing action. After the button is reset, the shaking plate can still be maintained in the on state or the off state because of the positioning mechanism.

BRIEF DESCRIPTION OF THE DRAWINGS

With the following description of the drawings and specific embodiments, the invention shall be further described in details.

FIG. 4 shows the abridged general view of the said button water-stopping device according to the preferred embodiments in the present invention, when the button is pressed and the water channel is on.

FIG. 5 shows the abridged general view of the said button water-stopping device according to the preferred embodiments in the present invention, when the button is loosen and the water channel is on.

DESCRIPTION OF THE PREFERRED EMBODIMENTS

It is the button water-stopping device according to the preferred embodiments in the present invention with references of FIGS. 1, 2, 3, 4, 5 and 6.

Figure 1:
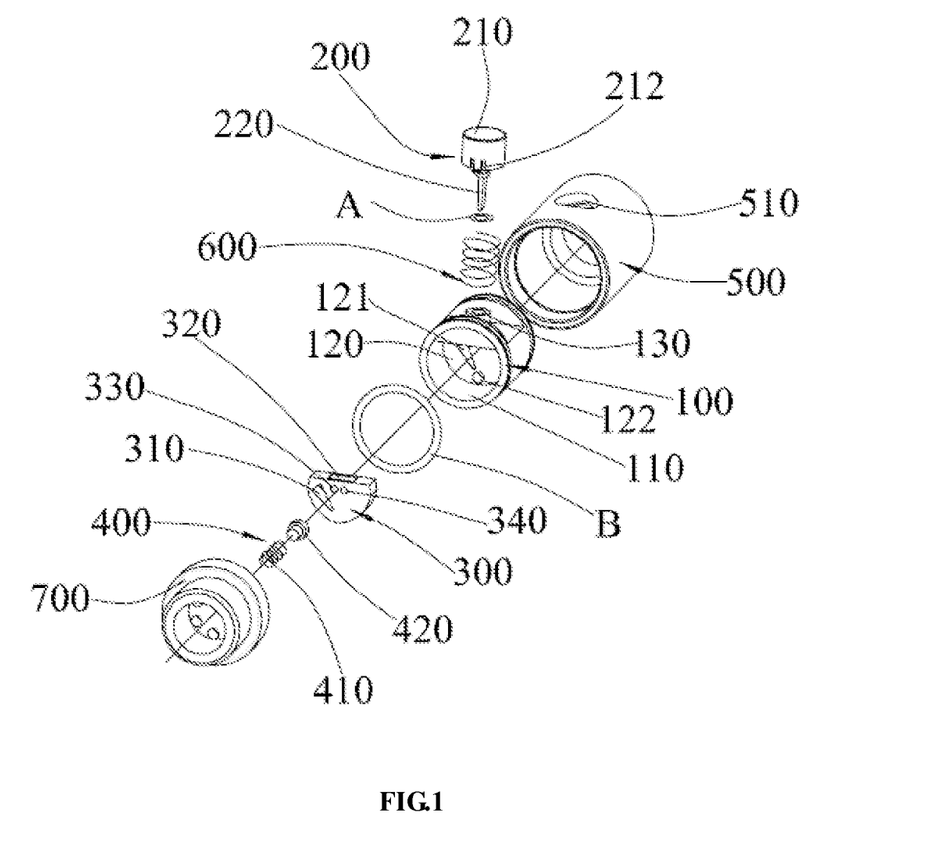
FIG. 1 shows the exploded view of the said button water-stopping device according to the preferred embodiments in the present invention.
Figure 2:
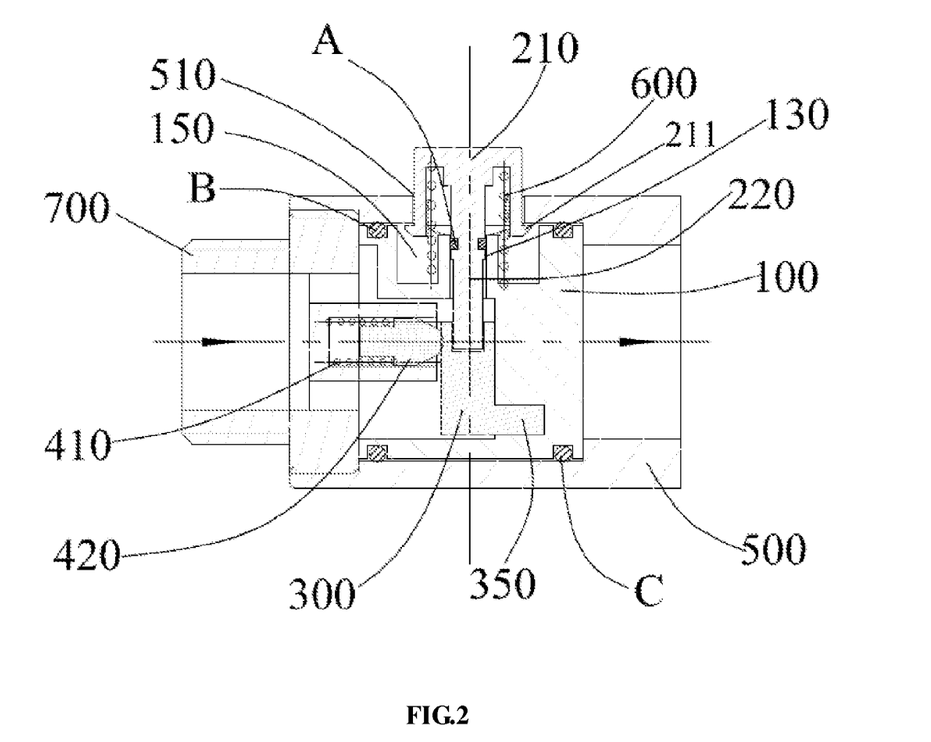
FIG. 2 shows the middle sectional view of the said button water-stopping device according to the preferred embodiments in the present invention.
Figure 3:
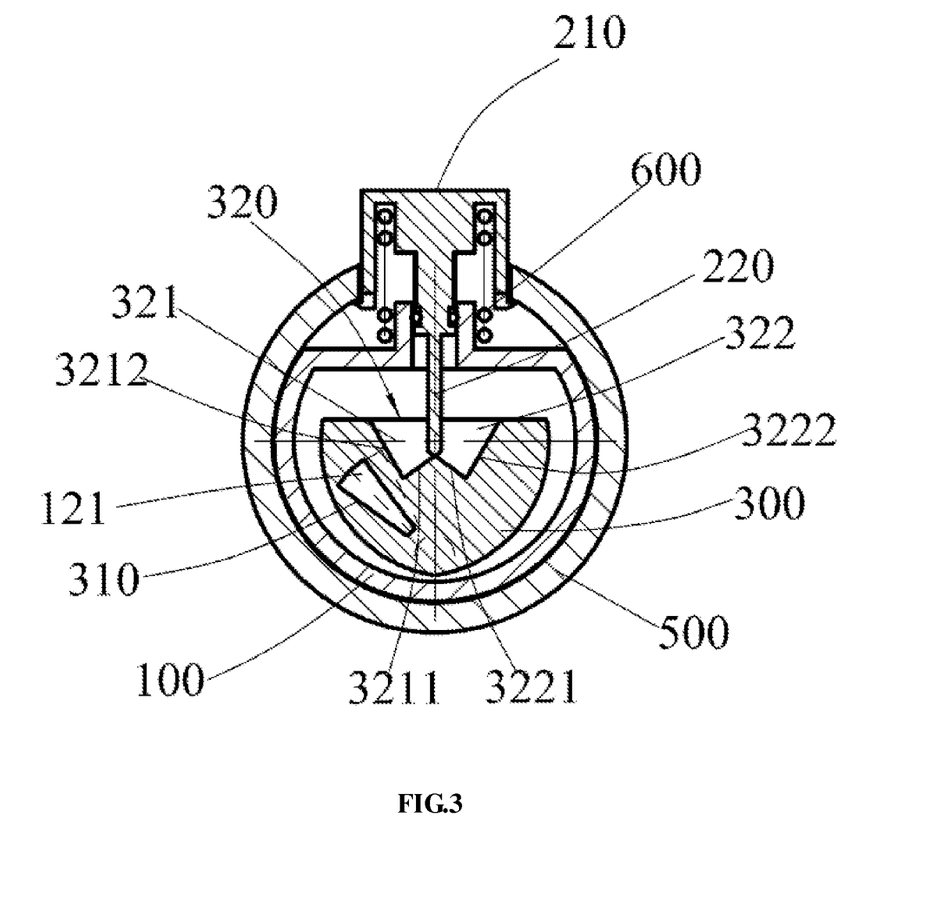
FIG. 3 shows the abridged general view of the initial state of the said button water-stopping device according to the preferred embodiments in the present invention.

In FIGS. 1, 2 and 3, the said button water-stopping device comprises: a main body 100, a button mechanism 200, a shaking plate 300, a positioning mechanism 400, a shell 500, a returning spring 600 and a connector 700.

A through hole 510 is established on the shell 500, and it penetrates the shell 500 from inside to outside.

Figure 7:
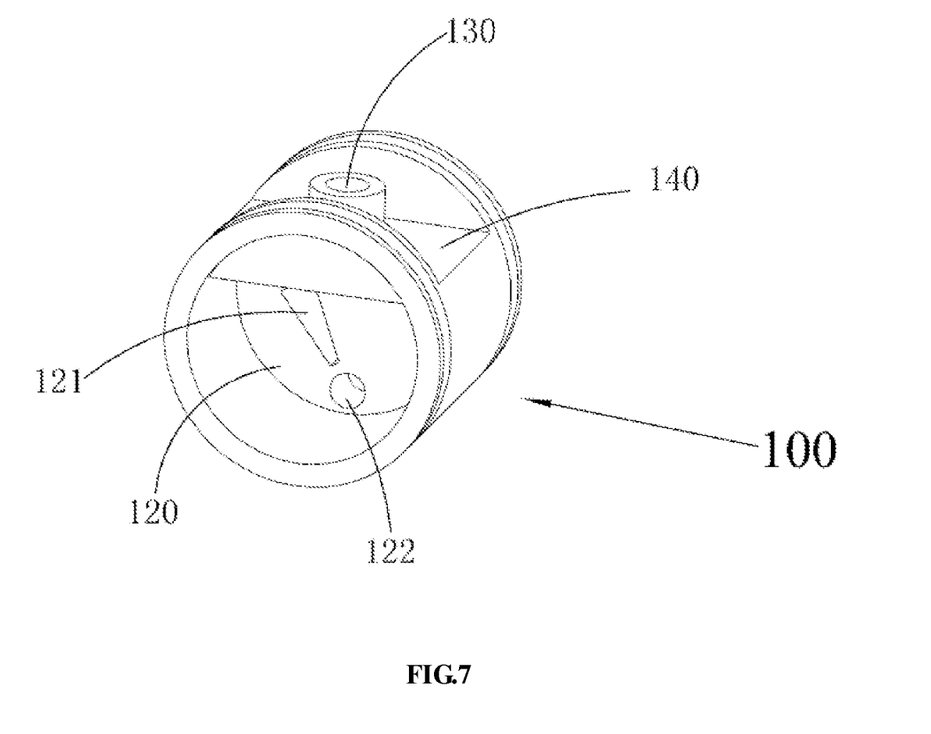
FIG. 7 shows the structure profile of the main body of the said button water-stopping device according to the preferred embodiments in the present invention.

FIG. 7 shows the main body 100, the main body 100 has a sealing plate 140 inside, and the sealing plate 140 divides the main body 100 into a upper enclosed space 150 and the lower water channel 110; a mounting hole 130 is established on the sealing plate 140, and it penetrates the sealing plate 140 from inside to outside; the water channel 100 hermetically has a division board 120 inside, the first water hole 121 is established on the division board 120, and it penetrates the division board 140 back and forth.

The main body 100 is fixed and sleeved in the shell 500, furthermore, the axis of the through hole 510 coincides with the axis of the button's mounting hole 130.

The said connector 700 can connect the outside water source. The connector 700 is fixed in the shell 500 and is located in front of the main body 100, namely the connector 700 is fixed in front of the main body 100.

The button mechanism 200 comprises a button 210 and an elastic rod 220 fixed under the button 210, the button 210 comprises a top wall and a surround wall extended from the periphery of the top wall to downside, there are elastic grooves 212 on the surround wall to form a suspended arm of which the end has a buckle 211.

The button 210 can be glidingly connected in the through hole 510 of the said shell 500, and be buckled in the through hole 510 by the buckle 211 to avoid its leaving from the through hole 510. The elastic rod 220 can glidingly reach into the mounting hole 130 of the main body 100 and stretch into the water channel 110 and the control groove 320, namely the button mechanism 220 can glidingly connected in the mounting hole 130 of the main body 100 up and down.

The returning spring 600 is set between the button 210 and the main body 100, and is located in the upper enclosed space 150 of the main body 100.

The said shaking plate 300 is an approximatively semicircular plate, and is asway set in the main body 100, the swing shaft 350 of the said shaking plate 300 is right under the button mechanism 200 and inserted in the positioning hole 122 of the division board; the said shaking plate 300 can glidingly and hermetically rely on the front of the division board; the shaking plate 300 has the second water hole 310 that matches the first water hole 121 and penetrates the shaking plate 300 from front to back and the control groove 320 opened in the top surface of the said shaking plate 300; The first positioning groove 330 and the second positioning groove 340 are bilateral symmetrically set in the front of the said shaking plate 300.

The control groove 320 comprises the first cooperative groove 321 and the second cooperative groove 322 which are bilaterally set; the said cooperative groove 321 is V-shape and has an inboard guiding wall 3211 that has guiding action and an outboard relying wall 3212 that has the relying action; the said cooperative groove 322 is also V-shape and has an inboard guiding wall 3221 that has guiding action and an outboard relying wall 3222 that has the relying action; the said first cooperative groove 321 and the said second cooperative groove 322 are bilaterally set and make the control groove be W-shape.

The said positioning mechanism 400 comprises an elastic part 410 which is a spring in the present embodiment and a positioning pin 420 resisted by the elastic part 410. The first end of the elastic part 410 is connected to the connector 700, the second end of the elastic part 410 is connected to the positioning pin 420. The positioning pin 420 alternatively resists the said first positioning groove 330 or the said second positioning groove 340 to maintain the device in the on state or the off state, namely the positioning mechanism 400 is set between the connector 700 and the shaking plate 300.

As requirement, the sealing ring A is set at the position where the said elastic rod 220 connects the button mounting hole 130 of the main body 100, the sealing ring B and C are set at the position where the main body 100 is assembled with the shell 500.

In this preferred embodiment, the operating principle of the button water-stopping device is:

FIG. 3 shows the abridged general view of the initial state of the said button water-stopping device according to the preferred embodiments in the present invention. At the moment, the said shaking plate 300 is located in the center of the main body 100 and relies on the side wall of the main body 100, the said elastic rod 220 is located at the joint of the first cooperative groove 321 and the second cooperative groove 322 of the said control groove 320 when the device is off.

Figure 4:
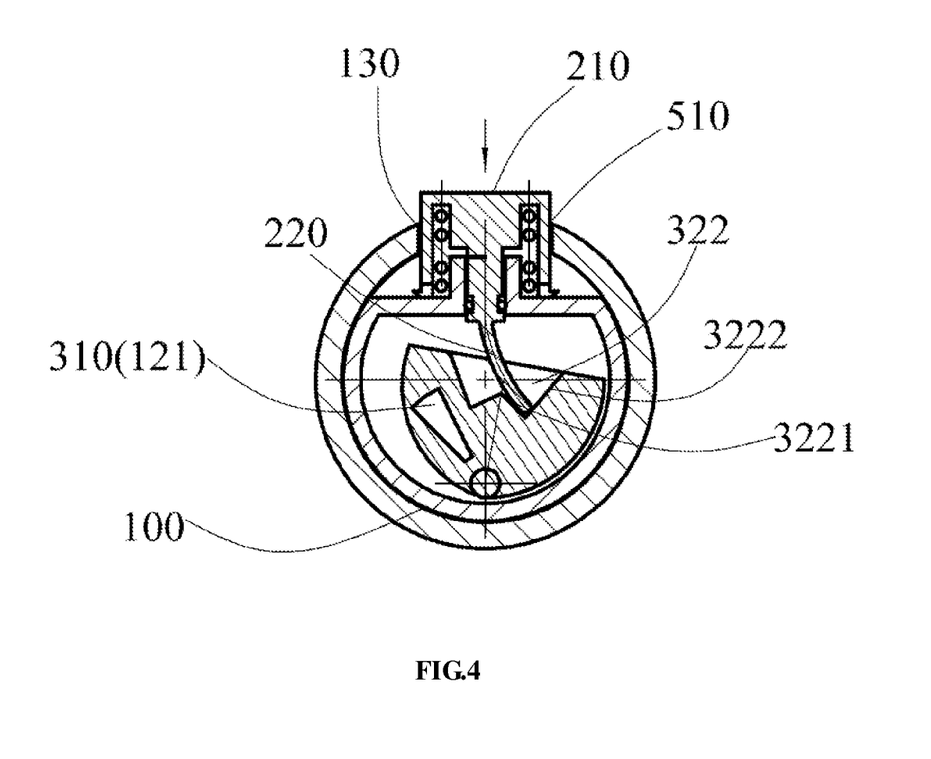

According to FIG. 4, the returning spring 600 is compressed when the button 210 is pressed down so that the elastic rod 220 of the button 210 glides downwards. Assuming that the positioning pit 420 is resisting the second cooperative groove 322, the elastic rod 220 is bended by the guiding wall 3221 and glides downwards along the guiding wall 3221 until the peak of the elastic rod 220 relies (stops) on the relying wall 3222 of the cooperative groove 322 of the control groove 320.

When the pressing down of the button 210 is going on, the elastic rod 220 resists the relying wall 3222 of the shaking plate 300 to make the shaking plate swing to left, then the positing 420 resists and is aligned with the second positioning groove 340 of the said shaking plate 300, meanwhile the second water hole 310 of the shaking plate 300 is aligned with the first water hole 120 of the division board 120, and the water channel is on.

Figure 5:
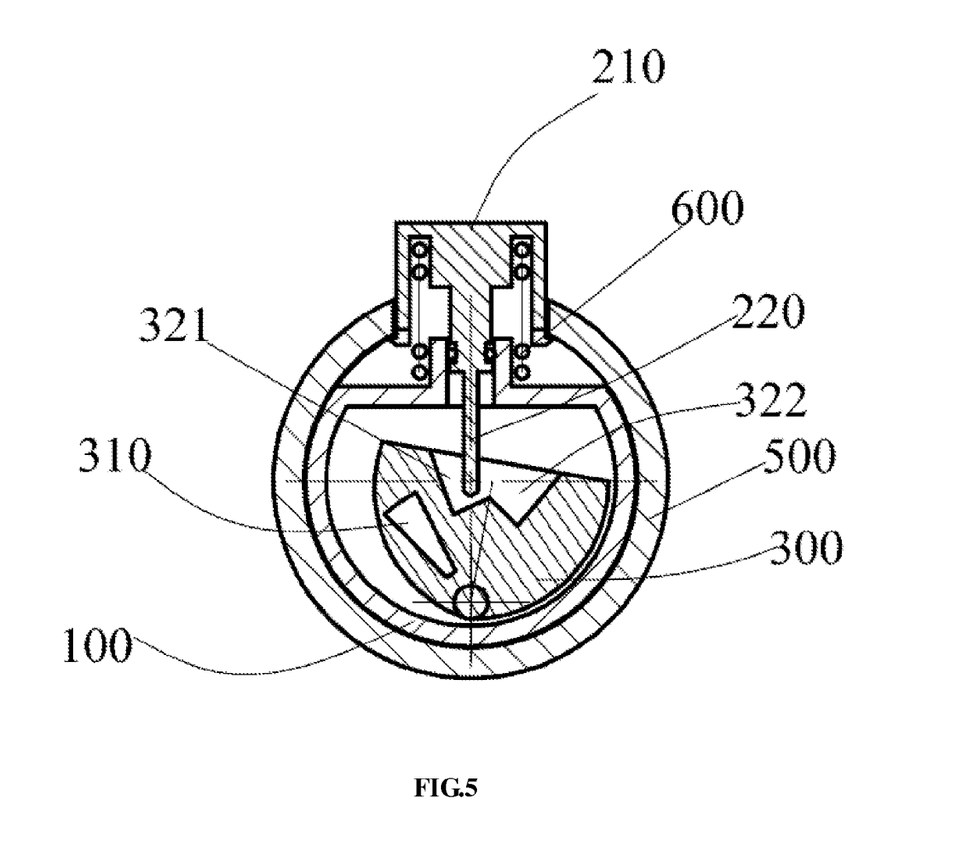

According to FIG. 5, when the button 210 is loosen, the returning spring 600 makes the button go back to the position of the initial state, meanwhile the positioning pin 420 makes the shaking plate 300 stand still, the second water hole 310 is still aligned with the first water hole 121 of the division board, the button water-stopping device is still on.

Figure 6:
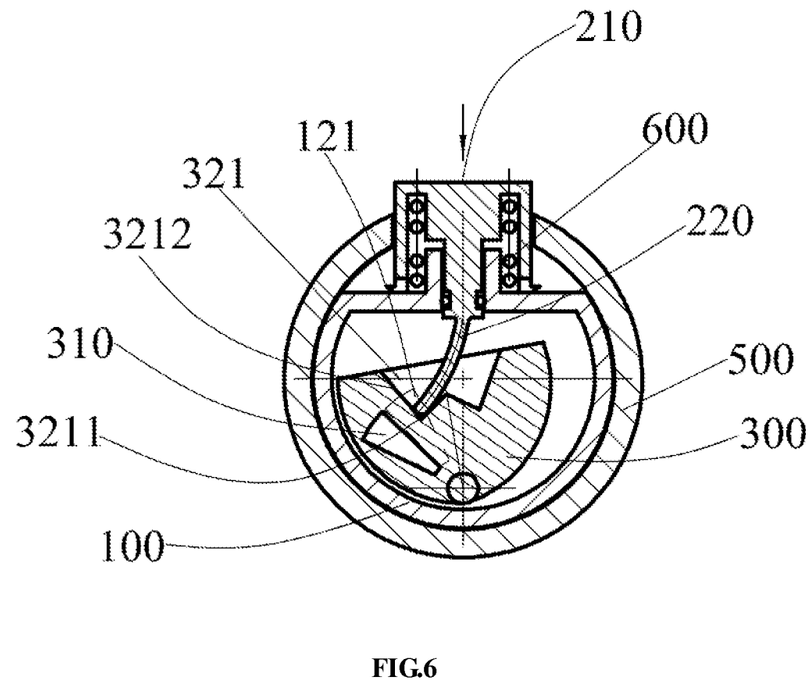
FIG. 6 shows the abridged general view of the said button water-stopping device according to the preferred embodiments in the present invention, when the button is pressed and the water channel is off.

According to FIG. 6, when the button 210 is pressed down again, the returning spring 600 is compressed again, so that the elastic rod 220 is pushed to the first cooperative groove 321 of the control groove 320; when the elastic rod 220 touches the guiding wall 3211 of the said cooperative groove, the said guiding wall 3211 makes the elastic rod bend and glide downwards along the guiding wall 3211 until the peak of the said elastic rod relies on the relying wall 3212.

When the pressing down of the button 210 is going on, the elastic rod 220 resists the relying wall 3222 of the shaking plate 300, so that the shaking plate 300 makes the positioning pin 420 glide by overcoming the elastic force of the elastic part 410, so that the positioning pin 420 is loosen from the second cooperative groove 322, and then the shaking plate 300 swings to right until the positioning pin 420 resists and is aligned with the first positioning groove 330, meanwhile the second water hole 310 is staggered from the first water hole 121 to make the water channel off;

And then loosing the button 210, the returning spring 600 makes the button 210 go back to home position; because of the fixing effect of the elastic part 410 to the positioning pin 420, the said second water hole 310 is still staggered from the first water hole 121, and the button water-stopping device keeps off.

In like manner, continuing to press the said button 210 and repeating it again and again make the water-stopping device on or off alternatively.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

A button water-stopping device and its control method in the present invention skillfully match the elastic bending characteristic of the elastic rod with the two cooperative grooves of the control groove, and make the shaking plate swing to left or to right by alternative inserting and resisting of the elastic rod to the two cooperative grooves, so that the on or off of the water channel through the button is achieved, the present invention has good industrial applicability because of its easy using and simple structure.

What is claimed is:

1. A button water-stopping device, comprising:
a main body having a water channel that penetrates the main body therethrough, and a division board that is hermetically set in the water channel, the division board having a first water hole that penetrates the division board therethrough;
a button mechanism being glidingly connected to the main body, the button mechanism comprising a button and an elastic rod fixed to the button, the elastic rod extending into the water channel; and
a shaking plate set in the main body, and having a second water hole that penetrates the shaking plate therethrough, and a control groove which comprises two cooperative grooves that are bilaterally set;
the elastic rod extending into the control groove and alternatively resisting one of the two cooperative grooves to make the shaking plate swing so that the water hole of the shaking plate is aligned with the first water hole to open the water channel, or is staggered from the first water hole to shut the water channel.

2. The button water-stopping device according to claim 1, wherein each said cooperative groove is V-shaped and has an inboard guiding wall that has a guiding action and an outboard relying wall that has a stopping action.

3. The button water-stopping device according to claim 2, wherein said two cooperative grooves are bilaterally symmetrically set.

4. The button water-stopping device according to claim 3, wherein said two cooperative grooves are arranged so that the control groove is W-shaped.

5. The button water-stopping device according to claim 4, wherein the shaking plate has a swing shaft disposed right under the button mechanism, and said main body has a mounting hole, the elastic rod passing through the mounting hole from outside to inside the main body, and reaching into the water channel and the control groove.

6. The button water-stopping device according to claim 4, further comprising a positioning mechanism that includes an elastic part and a positioning pin resisted by the elastic part, two positioning grooves being bilaterally symmetrically set in the shaking plate, the positioning pin alternatively resisting one of the two said positioning grooves to maintain the device in an open state or a shut state.

7. The button water-stopping device according to claim 6, further comprising a connector fixed at a front of the main body, the positioning mechanism being set between the connector and the shaking plate.

8. The button water-stopping device according to claim 4, wherein said shaking plate includes a swing shaft inserted in a positioning hole of the division board.

9. The button water-stopping device according to claim 1, wherein the shaking plate has a swing shaft disposed right under the button mechanism, and said main body has a mounting hole, the elastic rod passing through the mounting hole from outside to inside the main body and reaching into the water channel and the control groove.

10. The button water-stopping device according to claim 1, further comprising a positioning mechanism that includes an elastic part and a positioning pin resisted by the elastic part, two positioning grooves being bilaterally symmetrically set in the shaking plate, the positioning pin alternatively resisting one of the two said positioning grooves to maintain the device in an open state or a shut state.

11. The button water-stopping device according to claim 10, further comprising a connector fixed at a front of the main body, the positioning mechanism being set between the connector and the shaking plate.

12. The button water-stopping device according to claim 1, further comprising a returning spring, and a shell having a penetrating through hole, the main body being fixed and sleeved in the shell, the button being glidingly connected in the through hole, the returning spring being set between the button and the main body.

13. The button water-stopping device according to claim 12, wherein said main body includes a sealing plate that divides the main body into an upper enclosed space and the water channel; the button mechanism and the returning spring being movable up and down in the enclosed space; the shaking plate being in the water channel.

14. The button water-stopping device according to claim 13, wherein said shaking plate is an approximatively semi-circular plate.

15. The button water-stopping device according to claim 1, wherein said shaking plate includes a swing shaft inserted in a positioning hole of the division board.

16. The button water-stopping device according to claim 4, further comprising a returning spring, and a shell having a penetrating through hole, the main body being fixed and sleeved in the shell, the button being glidingly connected in the through hole, the returning spring being set between the button and the main body.

17. The button water-stopping device according to claim 16, wherein said main body includes a sealing plate that divides the main body into an upper enclosed space and the water channel; the button mechanism and the returning spring being movable up and down in the enclosed space; the shaking plate being in the water channel.

18. The button water-stopping device according to claim 17, wherein said shaking plate is an approximatively semi-circular plate.

19. A method of controlling a device, comprising:
providing a button water-stopping device, having:
  a main body having a water channel that penetrates the main body therethrough, and a division board that is hermetically set in the water channel, the division board having a first water hole that penetrates the division board therethrough;
  a button mechanism being glidingly connected to the main body, the button mechanism comprising a button and an elastic rod fixed to the button, the elastic rod extending into the water channel; and
  a shaking plate set in the main body, and having a second water hole that penetrates the shaking plate therethrough, and a control groove which comprises two cooperative grooves that are bilaterally set, each of said cooperative grooves being V-shaped and having an inboard guiding wall that has a guiding action and an outboard relying wall that has a stopping action;
  the elastic rod extending into the control groove and alternatively resisting one of the two cooperative grooves to make the shaking plate swing to a left or to a right, so that the second water hole of the shaking plate is aligned with the first water hole to open the water channel, or is staggered from the first water hole to shut the water channel; and
pressing the button down, so that the elastic rod of the button mechanism glides downwards, and when the elastic rod touches the inboard guiding wall of one of the cooperative grooves of the shaking plate, the elastic rod is bent by the inboard guiding wall and glides downwards along the inboard guiding wall until a peak of the elastic rod abuts on the outboard relying wall of the cooperative groove;
wherein while the button is being pressed, the elastic rod resists the outboard relying wall of the shaking plate to make the shaking plate swing so that the water hole of the shaking plate is aligned with the first water hole of the main body to open the water channel, or the second water hole is staggered from the first water hole to close the water channel.

* * * * *